Sept. 18, 1934.　　　D. E. BRIGGS ET AL　　　1,973,694
FILTER CONDENSER.
Filed May 19, 1932　　2 Sheets-Sheet 1

INVENTORS.
DOUGLAS E. BRIGGS.
CLIFFORD H. KAIN.
BY
ATTORNEY.

Sept. 18, 1934.  D. E. BRIGGS ET AL  1,973,694
FILTER CONDENSER
Filed May 19, 1932  2 Sheets-Sheet 2

INVENTORS.
DOUGLAS E. BRIGGS.
CLIFFORD H. KAIN.
BY
ATTORNEY.

Patented Sept. 18, 1934

1,973,694

UNITED STATES PATENT OFFICE 1,973,694

FILTER-CONDENSER

Douglas E. Briggs, Detroit, Mich., and Clifford H. Kain, San Carlos, Calif., assignors, by mesne assignments, to Allied Products Corporation, Detroit, Mich., a corporation of Illinois Application May 19, 1932, Serial No. 612,272

17 Claims. (Cl. 175—315)

This invention relates to electrolytic condensers or filters and method of making the same, and the object of the invention is to provide capacity of an improved type of construction for changing a pulsating direct current to a non-pulsating direct current.

Devices of this general character have heretofore been made but have been found inefficient in several respects. Firstly, they are of too great weight and bulk for the capacity, and a feature and object of this invention therefore is to secure light weight, less cubical content and a materially higher efficiency than has heretofore been attained in devices for this purpose. Secondly, previously known types of filters, condensers, or capacitors as they are sometimes termed, are difficult to handle not only by reason of excess weight but because the parts are readily disarranged in relationship of the component parts. Filter-condensers of the general type have usually been made up of a series of plates and oftentimes with a liquid electrolyte between the plates and this tends to short circuit the plates as the free electrolyte readily seeps in through crevices or cracks occurring in the insulating material by which the plate edges are separated and the efficiency of the device is thus practically or wholly destroyed.

A second purpose of this invention therefore is to provide a construction wherein the cells are freed of excess electrolyte and the plates are completely insulated one from the other and are so permanently assembled as to prevent displacement thereof in the handling of the assembled unit.

The present invention utilizes a series of comparatively thin plates spaced by an absorbent material such as paper carrying the electrolyte. This specific feature of the spacing of the plates by an absorbent paper carrying the electrolyte is disclosed in our co-pending application Serial No. 560,370, filed August 31, 1931, and in that joint application is disclosed means for maintaining the plates under pressure in a container wherein uniformity of contact of the plate surfaces with the absorbent material is secured, said means comprising a permanent metal framework associated with the plates in the container. The present invention seeks to avoid the use of such metal framework and its weight and the consequent magnetic field set up thereby, and a feature of this invention consists in assembling the cells of any desired number consisting of alternate metal plates and sheets of absorbent material carrying the electrolyte (as for instance eighteen per cent solution of sodium hydroxide), placing the plates and intervening sheets of absorbent material under pressure to insure uniformity of surface contact and free the sheets of excess electrolyte, then spraying the exposed surface of the assembled plates and sheets of absorbent material with an insulating material such as liquid asphalt sufficient to insulate the edges of the plates one from the other, then binding these plates together as by a cord or tape to maintain the same under pressure subsequent to removal from the press or the means for applying pressure thereto.

The assembled plates and sheets are then again coated with an insulating material to provide an appreciable thickness of insulation in the neighborhood of one-eighth of an inch in thickness, then applying a paper wrapping to the entire assembly which adheres to the coating last applied either by first heating the coating slightly to secure a tacky surface or by applying a heated roller to the sheet of paper after being wound thereon. The purpose of the paper is to hold the plates in such manner as to prevent their being readily distorted out of alignment in handling, it being most desirable that these plates shall be not only under pressure contact with the carrier for the electrolyte but also maintained in aligned relationship. Various forms of plates may be used, as for instance square, round, or hexagonal but, irrespective of the shape of each of the plates, the paper being wound tightly thereabout and secured in place by the insulation will be found sufficient to maintain the parts in their respective aligned relationship one with the other and permit ordinary handling without distortion.

A further principal object of the invention is to provide a method of construction and assembly of parts whereby excessive gassing of the condenser in use is prevented. This consists in impressing an electric current of 1.7 or more volts on the assembled plates and absorbent sheets subsequent to placing the same under pressure and while the cells are open to atmosphere thereby causing discharge of excess electrolyte both in a liquid and gaseous form whereby when the battery is thereafter completed a voltage up to about 1.7 volts was applied without producing sufficient gas to disrupt the condenser. By this step a condenser is provided having a higher efficiency than has heretofore been attained.

Another feature of the invention is involved in the manner in which the terminals for the plates may be provided. As indicated in our said co-pending application, a terminal was secured to the end plates of the series as by welding or soldering and such terminal sometimes becomes loosened from the plate causing deficiencies if not completely destroying the function of the capacitor. By our construction certain of the plates as for instance the two end plates of the series having an integral lug extending from the one of their edges which projects through the wrappings and container in which the unit is held to which the circuit wires are connected in any approved way. By such an arrangement not only is the accidental loosening of the terminals from the plates avoided but we further eliminate the difficulty of provision of a terminal in an intermediate plate of the series which heretofore would cause such plate to be spaced a greater distance from the adjacent plates than the remainder of the series and thus reducing the capacity of the unit. By maintaining the least practicable distance apart we decrease the internal resistance thereby increasing the efficiency of the unit. The electrolytic carrier is preferably a sheet of absorbent paper but may be of any approved form in which the necessary amount of the electrolyte may be held equally distributed throughout the carrier. One character of electrolyte found efficient for this purpose is sodium hydroxide with which the absorbent sheets if such be used are impregnated. These sheets may be quite dry yet sufficient moisture to activate the cell is necessary.

The assembled plates and sheets while under the pressure and before application of any insulating material are either allowed to dry at the edges or may be even heated to hasten such drying. The purpose of this is to clear the said edges of free electrolyte and to make the edges of the sheets of absorbent material again absorbent so that when the liquid asphalt is sprayed or otherwise applied to the exposed edges as above mentioned, the liquid will be readily taken up by the exposed edges of the sheets and in fact will penetrate to between the plates a slight distance. The object of this character of treatment is twofold, that is, to not only provide insulation between the plates but to seal the space between the plates to prevent loss of moisture content of the carrier whereby evaporation may not take place due to the pores of the edges of the sheet being sealed.

These and other objects and various novel features of the invention are hereinafter more fully described and claimed, and the preferred form of construction of a capacitor or filter-condenser involving our invention is shown in the accompanying drawings in which—

Figure 1:
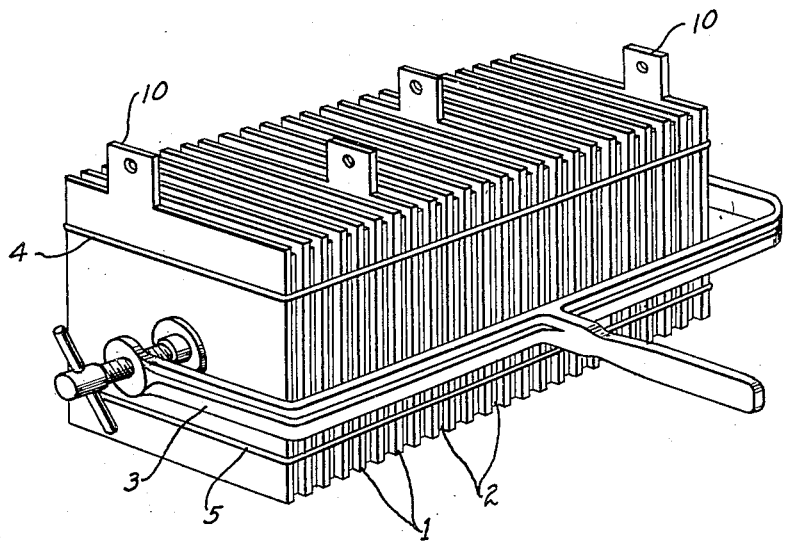
Fig. 1 is a perspective view showing the alternate series of plates and electrolytic carrier secured together under pressure.

The capacitor or filter condenser is formed of a series of plates 1 and interposed sheets of absorbent material or carrier 2 for an electrolyte so that the final unit consists of a series of comparatively thin metal plates alternating with thin sheets of absorbent material such as paper or other convenient material. The sheets usually, before assembly with the plates, probably have been submitted to a practically eighteen per cent solution of sodium hydroxide and after assembly the plates and sheets are placed under pressure, as by means of a screw clamp of any approved type indicated at 3, which causes excess electrolyte to be expressed from the cells and cords or strips 4 and 5 are fastened thereabout to hold the plates under pressure subsequent to removal from the clamp. While held under pressure and the cells open to atmosphere a current of 1.7 or more volts can be impressed thereon. This produces gasification and development of pressure in the cells thereby causing discharge of excess electrolyte both in liquid and gaseous form and this current is maintained on the condenser until no liquid electrolyte is apparently being discharged and the current switched off before gasification ceases thus insuring a remaining amount of electrolyte sufficient to insure low internal resistance.

We have found that in impressing voltage on cells open to atmosphere that the period of time varies not only with the voltage applied but with the variation in quantity of electrolyte in the cells. Therefore, to determine when the cells have been freed of excess electrolyte so that the amount remaining is sufficient to maintain a moist condition and minimum internal resistance, the impressed voltage should be applied until the edges of the absorbent sheets exposed to atmosphere begin to dry. This, when sodium hydroxide is used as an electrolyte, will be indicated by a whitish powder at the sheet edges indicating that insufficient liquid is being forced out by gasification to maintain said edges of the sheets in normal condition.

It is possible to continue the current on the battery to a detrimental degree causing loss of the proper amount of electrolyte to secure efficiency due to the fact that the cells are open and the gas passes off rapidly therefrom. Thus care should be exercised in the performance of this step to secure the highest efficiency. After the condenser has been completed by the sealing of the cells and insulating the plates as hereinafter described, it can be used normally without liability of breaking the seal and the consequent loss of efficiency. Thus, insofar as we have determined, the desirability of the several steps and the resultant efficiency, we are able to increase the capacity of a condenser and therefore for a certain current output we are able to materially reduce the size of the condenser.

The condenser, especially if the absorbent sheets are made of paper, is allowed to stand subsequent to the discharge of excess electrolyte to further dry the edges of the sheets or they may be submitted to heat to hasten the drying of the edges.

Figure 5:
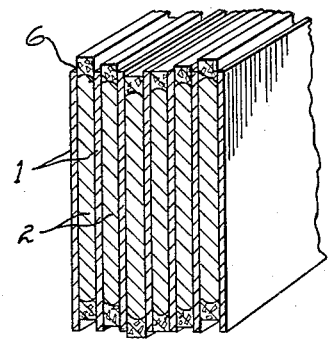
Fig. 5 is a detail in perspective illustrating the dried edges of the absorbent sheets.

This condition is intended to be illustrated at 6 in Fig. 5 in which these exposed edges are stippled to indicate a different physical state than the moist condition of the remainder of the sheet which is merely cross-hatched. It will further be noted from this Fig. 5 that it is not necessary to exactly align the sheets with the plates as the edges of the sheets may project slightly without detrimental result. Subsequent to the drying of these edges they are either sprayed with or have applied thereto an insulating material in liquid form such as liquid asphalt and due to the edges of the sheet being in condition to absorb liquid the treated edges when dry effectually prevent loss of moisture content of the body of the sheet. In treating the assembled plates and sheets, the edges of the plates are also coated with the insulating material and the said insulating material penetrates to between the plates slightly below the peripheral edges thereof. Thus it will be noted we have provided a cell or a series of cells which consist of two plates in pressure contact with the opposite sides of the electrolyte carrier, preferably an absorbent paper, which is impregnated with an electrolyte and is maintained in a moist condition due to the edges of the carrier having been sealed to prevent evaporation of the moisture or loss of electrolyte under normal conditions of operation.

Due to the condenser having been freed of excess electrolyte the amount remaining is but little more than that required to maintain moist condition of the cells.

It has been well known heretofore to place a series of cells in the container and to cover the edges of the cells with asphaltum as is described in our pending application Serial No. 560,370. It will be noted that in such prior construction the current charge that may be safely imposed on the condenser is limited by the fact that the current tends to produce a gas and force liquid electrolyte out of the carrier which may seep in between the edges of the plates and the asphaltum or similar insulation placed thereabout. In this present construction such difficulty is eliminated by the steps heretofore described and a higher capacity and longer life is attained as well as the size and weight of the filter-condenser is for a certain capacity greatly reduced. If the cells be formed with an absorbent material, such for instance as an absorbent paper, and having first been dried as above stated, the pores of the absorbent sheet at the edges become completely filled with insulation which effectually prevents seepage of the electrolyte or loss of moisture by evaporation.

This method of forming the cells is of further advantage in that labor cost is reduced in assembly as the requirement of carefully placing the sheets in registration with the plates is avoided, it only being necessary that the sheets are in approximate registration with the plates so as not to materially reduce the effective area.

As previously stated, the plates and sheets are arranged in the alternate relation and placed in a clamp or press of any approved character as for instance such as suggested in Fig. 1 and pressure is mechanically applied thereto to press the sheets to sufficiently dry condition for the succeeding step of applying current of approximately 1.7 or more volts thereto as hereinafter stated. We have found that a pressure of ten pounds per square inch of plate area per cell is sufficient for the mechanical pressure step. It is to be noted that it is desirable to use a clamp or press of a character to permit turning of the assembled unit on an axis which permits ready handling of the same in application of the insulating material and the tying of the plates in assembled relation to maintain the same under pressure after removal from the clamp or press.

Figure 2:
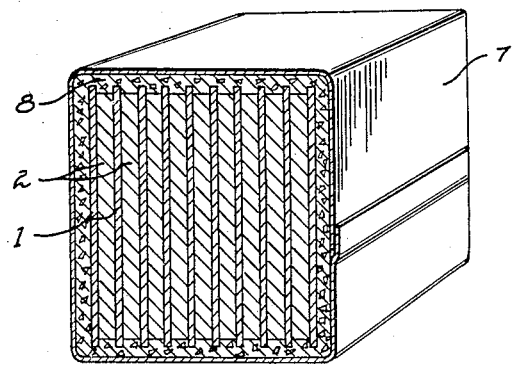
Fig. 2 is a perspective view partly in section showing the cells after being wrapped with the supporting paper.

As heretofore stated, after the initial application of the liquid asphalt the cords 4 and 5 are placed thereon, the unit removed from the clamp or press, a coating of asphalt in paste like form applied thereto and a wrapping of the paper 7 is then applied which may cover all sides of the unit or the upper face having the projecting lugs 10 may be left without a paper cover if desired. The paper wrapping should be of fairly stout character and is applied after the application of an asphalt or other material indicated at 8 in Fig. 2 is applied. This asphalt is a thick paste like mass and may be applied in any approved manner to the edges of the plates and the sheets subsequent to the application of the liquid asphalt and comparatively quickly hardens.

Prior to hardening and while the mass is yet in a sticky condition the paper is tightly wrapped thereabout and even after wrapping the paper may be pressed with a heated roller in order to insure uniform adhesion of the paper to the asphalt. This wrapping prevents displacement of the sheets and plates permitting the same to be handled without distortion or twisting of the same on a longitudinal axis and facilitates the handling of the same in the placement thereof in the container hereinafter more fully described.

Heretofore, it has been quite common to have considerable free electrolyte in the cells particularly in such cases where the liquid electrolyte is applied to between the plates and thus in such case the cells are formed subsequent to the parts being positioned in their final container. In such previous arrangement the plates are commonly spaced by being supported in grooves in the container and the absorbent paper is introduced by hand to between these plates and liquid electrolyte poured over the whole and, although the edges of the plates at the bottom and sides are attempted to be sealed by use of an asphalt the electrolyte tends to seep between the edges of the plates and the asphalt which may not unite perfectly with the edges of the plates. We have found that by first applying liquid asphalt to the edges of the plates and sheets and thereafter applying the thick asphalt a practically perfect adhesion between the plates and asphalt is secured.

Figure 3:
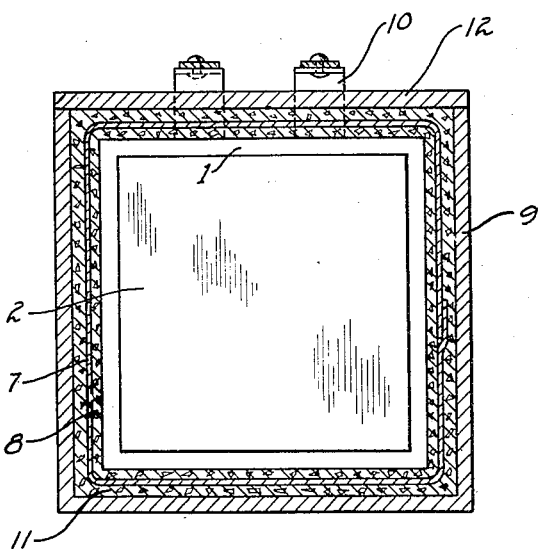
Fig. 3 shows the wrapped plates and sheets introduced into a container.

The labor of assembly of the plates and sheets by our new method herein disclosed is materially reduced as the sheets of absorbent material such as absorbent paper are first practically saturated with an electrolyte although not to such degree as would prevent the handling of the sheets without tearing the same. The sheets are then assembled in alternate relation with the plates and put in the press and the pressure applied to free the absorbent sheets from excess liquid electrolyte and while under pressure the cells are "gassed" by submitting the condenser to an electric charge as above described. The unit is then treated to seal the cells and to insulate the edges of the plates and the paste like asphalt to the thickness of approximately one-eighth of an inch is then applied and finally wrapped with a paper as previously stated. This unit may remain in this condition for an indeterminate period until ready to be placed in a container as there is no probability of loss of moisture content by evaporation. The container may be of any approved form such as is indicated at 9 in Fig. 3 which container is provided with a removable cover 12. Prior to placing the paper wrapped unit in the container, the container is first provided at the bottom with a thick asphalt indicated at 11, the unit positioned therein and the sides and the top of the unit covered with a paste like asphalt. It is to be noted that the terminals 10 project upwardly through the paper wrapping and that the cover 12 has slots to permit these lugs to project therethrough. This cover may be secured in place by any approved means not shown.

Figure 4:
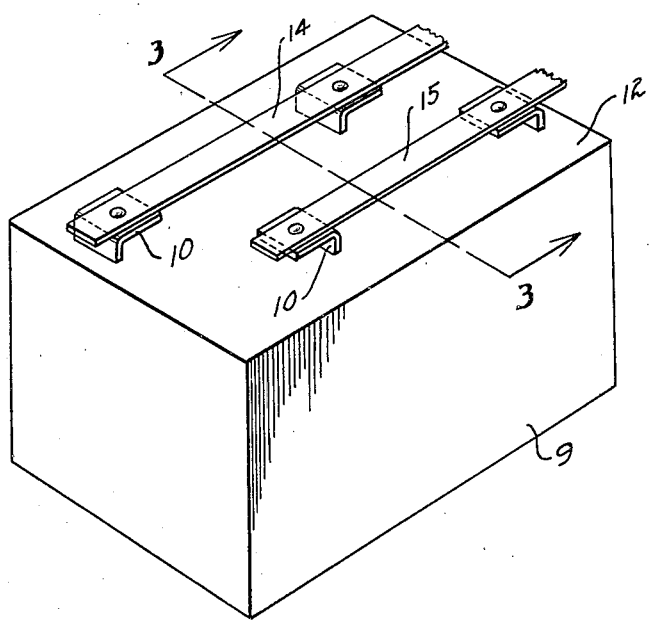
Fig. 4 is a perspective view showing one convenient method of connecting the terminals after assembly of the plates in the container.

The lugs 10 are preferably formed integrally with certain of the plates. Ordinarily, the end plates only of the series may be provided with the lugs for connection in a circuit. However, as the capacity of the condenser is dependent upon the plate area, additional lugs may be provided intermediate the end plates as indicated in Fig. 1 and by connecting these as indicated by the strips 14 and 15 of Fig. 4, the series of plates shown in Fig. 1 may be separated in two groups in parallel thus doubling the capacity of the condenser.

The strips 14 and 15 may be provided with terminal portions at their ends (not here shown) for ready connection in an electric circuit.

From the foregoing it will be evident that the described method of construction is quite simple, and the condenser produced has a higher efficiency than is secured from the previous known methods and permits use of thinner plates and thinner absorbent material. This is of importance in that a unit of certain capacity may be reduced in size and weight in comparison to the older constructions due not only to a more effective sealing of the cells but to the further fact that the capacity is increased due to the initial gassing of the cells prior to sealing the same. Further, we have secured a manner of assembly that lends itself more readily to production methods of construction eliminating much of the labor cost involved and to a material degree increasing the facility of handling and reducing the necessity of great care in assembly of the parts.

Likewise by the method and construction described, we have eliminated the necessity of the metal clamping elements disclosed in our said pending application Serial No. 560,370 and the excessive amount of compound required around the cellular assembly to cover and insulate the clamping frame and rods as shown in the said pending application. We have also reduced the weight of the filter unit in comparison to that shown in said pending application from fifteen to twenty per cent and have likewise eliminated the magnetic field set up by such a clamping frame forming a permanent part of the unit in our said former construction.

The foregoing description of the method of forming a filter-condenser in which the voltage impressed on the condenser while the cells are open to atmosphere is stated to be 1.7 is to be understood as referring particularly to a construction in which the electrolyte is sodium hydroxide or similar electrolyte containing a percentage of water. The impressed voltage may be much higher when using electrolyte not containing water. This feature or step of the invention therefore broadly consists in impressing an electric current upon the filter while the cells are open to atmosphere having a potential above that productive of electrolysis and for such period of time that in subsequent normal use of the finished condenser the gas developed in the cells is insufficient to break the seal and short circuit the same or otherwise materially impair the efficiency of the filter.

It is therefore believed evident from the foregoing that the various objects and features of the invention are obtained by the construction and method of construction of the unit described.

What we claim and desire to secure by Letters Patent of the United States is—

1. The method of producing a filter-condenser of the character described, comprising first assembling a series of metal plates in alternate relation with sheets of compressible material containing an electrolyte in liquid form, placing the same under pressure sufficient to insure surface contact of the plates and sheets and to reduce the quantity of electrolyte to a point below that productive of disruptive vapor tension through application of normal electric current thereto in use, covering the exposed surfaces of the sheets and plates with an insulating material, finally placing a wrapper about the unit in adhesive contact with the plastic material to maintain the same under pressure and prevent relative displacement of the plates and sheets thereby providing a unit capable of being readily handled without injury.

2. The method of producing a sealed cell containing an electrolyte consisting in first impregnating a sheet of absorbent material with liquid electrolyte, positioning the same between a pair of opposed metal plates under pressure whereby an excess of liquid electrolyte is expressed therefrom, then drying the edges of the sheet to free the same of moisture, then submitting the edges of the sheet to a bath of a liquid insulating material to thereby fill the said edges of the absorbent sheet, and finally securing the said plates and sheet of absorbent material in the stated relation.

3. The method of producing a filter-condenser of the character described which consists in assembling a series of metal plates in alternate relation with sheets of absorbent material containing a liquid electrolyte, placing the said series under pressure to free the absorbent sheets of excess liquid electrolyte, then drying the unit while under pressure to a degree sufficient to free the edges of the sheets of moisture content to thereby cause the said edges to again become absorbent, then applying insulation in liquid form to the exposed edges of the sheets and plates to thereby fill the pores of the absorbent sheets thereby sealing the said edges of the sheets and any possible interstice between the edges of the plates and sheets to prevent loss of electrolyte by evaporation, placing a wrapper tightly about the unit while the parts are under pressure to secure an assembly that may be freely handled without displacement of the parts, and finally placing the same in a container in insulated relation therewith.

4. The method of producing a filter-condenser of the character described, consisting in first assembling a series of metal plates in alternate relation with sheets of material containing an electrolyte in liquid form, placing the assembled plates and sheets under pressure sufficient to express excess electrolyte therefrom, coating the exposed surfaces of the said assembly with an insulating material, binding the sheets together whereby when removed from the pressure applying means the plates and sheets are maintained in pressure contact, applying an appreciable amount of insulating material in plastic form to the unit, then placing a wrapper around the assembled unit to cause the same to adhere to the plastic and further to so enclose the plates as to prevent displacement of the plates and maintain the form of the unit, placing the wrapped assembly in the container, and finally pouring an insulating plastic therein to fill the space between the assembly and the container.

5. The method of producing a filter-condenser of the character described, comprising first assembling a series of metal plates in alternate relation with sheets of absorbent material containing an electrolyte in liquid form, placing the assembled plates and sheets under pressure sufficient to express excess electrolyte therefrom, coating the exposed surface of the electrolyte with an insulating material adhesive in character, enclosing the assembled plates and sheets with a wrapper tightly wound thereabout and adhering to the insulating material whereby the assembled plates and sheets are fixedly held in their assembled relation to provide a unit that may be freely handled, placing the wrapped assembly in a container, and finally pouring the insulating plastic to fill the spaces between the assembly and the container.

6. The method of producing a filter-condenser which consists in assembling a pair of plates with a sheet of absorbent material containing liquid electrolyte therebetween and in pressure contact, drying the edges of the sheet to free said edges of moisture content to cause the same to again become absorbent, coating the edges of the plates and the sheet with a liquid insulation whereby the said absorbent edges become filled therewith, covering the plates and the edges of the sheet with an insulating plastic adhesive in character, and then tightly wrapping the same in a wrapper adhering to the plastic to thereby provide a unit assembly capable of being readily handled without displacement of the parts.

7. The method of producing a filter-condenser which consists in assembling a series of plates in alternate relation with sheets of absorbent material containing a liquid electrolyte, placing the said series under pressure to free the said sheets of excess liquid electrolyte and to insure surface contact between the said sheets and plates, binding the said series together to hold them in pressure contact, then drying the edges of the sheets to render the same absorbent, the dried area of the sheets extending a short distance between the metal plates, applying liquid insulation material of a character tending to harden to the edges of the plates and sheets whereby the said absorbent area of the sheets becomes filled with insulation, and thereby sealing the cells to prevent further loss of electrolyte under normal conditions, applying a plastic adhesive insulation material to the outer surface of the assembly, tightly wrapping the assembly with an integral sheet of comparatively strong paper in adhesive contact with the plastic to thereby maintain the unit under pressure and free from displacement of the parts in ordinary handling, and finally placing the wrapped unit in a container in insulated relation therewith.

8. The method of producing a filter-condenser of the type described which consists in first assembling a series of metal plates in alternate relation with sheets of absorbent material containing a liquid electrolyte, applying pressure to the end plates of the series to insure surface contact between the several plates and sheets, then submitting the same to electric current of not less than 1.7 volts to cause gasification of the cells while open to atmosphere thereby freeing the cells of a portion of the contained electrolyte, ceasing the application of current charge to the cells when liquid electrolyte is no longer being discharged and prior to cessation of the gasification whereby sufficient electrolyte is retained in the absorbent material to insure low internal resistance, then while maintaining the same under pressure finally sealing the cells to prevent loss of electrolyte through evaporation while in use.

9. The method of producing a filter-condenser of the type described which consists in assembling a series of metal plates in alternate relation with sheets of absorbent material containing a liquid electrolyte, applying pressure to insure surface contact between the plates and sheets and thereby freeing the sheets of a portion of the liquid electrolyte, then submitting the same to an electric current having a potential above that productive of electrolysis to cause an internal pressure through gasification to thereby discharge additional electrolyte in the form of liquid and gas, and ceasing application of said current thereto prior to cessation of gasification and loss of electrolyte sufficient to insure low internal resistance, then sealing the cells, and insulating the same one from the other while held in pressure contact.

10. In a method of forming a filter-condenser consisting of a series of metal plates in alternate relation with thin sheets of material providing a carrier for electrolyte in excess of the quantity required to provide low internal resistance, the steps which consist in applying electric current to the assembled cells having a potential above that productive of electrolysis and while the cells are open to atmosphere to cause discharge of electrolyte from the cells by internal pressure to such point of depletion that, subsequent to the sealing of the cells, gas produced therein in normal use of the condenser in an electric circuit is insufficient to break the seal through internal pressure.

11. In a method of forming a filter-condenser consisting of a series of metal plates in alternate relation with sheets carrying electrolyte in excess of the quantity required to provide low internal resistance, the steps which consist in applying electric current thereto having a potential above that productive of electrolysis while the assembled cells are open to atmosphere to thereby discharge electrolyte by internal pressure, and ceasing application of current to the assembled cells at a predetermined point in the depletion of the contained electrolyte, and finally sealing the cells to prevent further loss of electrolyte.

12. In a method of forming a filter-condenser consisting of a series of metal plates alternating with sheets of absorbent material containing electrolyte in excess of the quantity required to provide low internal resistance, the steps which consist in applying electric current to the assembled cells while open to atmosphere to discharge electrolyte therefrom by internal pressure, and ceasing application of current thereto prior to depletion of electrolyte below a quantity sufficient to insure low internal resistance in the assembled unit.

13. In a method of forming a filter-condenser consisting of a series of metal plates in alternate relation with an electrolytic carrier containing electrolyte in excess of the quantity required to provide low internal resistance, the step which consists in discharging excess electrolyte from the cells while open to atmosphere by application of electric current thereto having a potential above that productive of electrolysis.

14. The method of forming a filter-condenser consisting in assembling a series of metal plates in alternate relation with a carrier containing liquid electrolyte in excess of the quantity necessary to produce low internal resistance, then, while the cells are open to atmosphere, applying pressure mechanically to the assembled unit, and then, while under pressure, applying electric current thereto having a potential above that productive of electrolysis to gasify the cells and thereby to the desired degree free the same of excess electrolyte, and finally sealing the cells to insulate the plates and prevent further depletion of electrolyte by gasification or evaporation.

15. The method of producing a filter-condenser of the character described which consists in first assembling a series of sheet metal plates in alternate relation with sheets of compressible material containing liquid electrolyte in quantity greater than desired in the finished condenser, applying pressure to the assembled sheets and plates sufficient to insure uniform surface contact therebetween and express a portion of the electrolyte, then subjecting the plates and sheets to an electric current to cause decomposition of the electrolyte and gasification thereof while open to atmosphere to free the cells of a further portion of the contained electrolyte, covering the exposed surfaces of the sheets and plates with a plastic insulating material, then prior to release from the pressure applying means, placing a wrapper about the entire unit in adhesive contact with the plastic material to maintain the pressure contact between the plates and sheets and prevent relative displacement thereof thereby providing a unit capable of being readily handled without injury.

16. In a method of forming a filter-condenser, the steps consisting in first assembling a series of flat iron plates in pressure relation with alternate sheets of a compressible material containing a liquid electrolyte, then, while the cells are open to atmosphere, applying an electric current thereto to thereby, through decomposition and gasification, reduce the quantity of electrolyte to such degree as to avoid development of disruptive pressures in normal use.

17. In a method of forming a filter-condenser which consists in first assembling a series of sheet iron plates having opposite flat faces in alternate relation and face contact with flat sheets of material containing an electrolyte, then, while the cells are open to atmosphere, applying an electric current thereto to thereby, through decomposition and gasification, reduce the quantity of electrolyte to such degree as to avoid development of the disruptive pressures in normal use.

DOUGLAS E. BRIGGS.
CLIFFORD H. KAIN.